ent Office 3,431,121
Patented Mar. 4, 1969

3,431,121
GELATINE COMPOSITIONS
Ronald Williams, 5 Mainway, Alkrington,
Middleton, England
No Drawing. Filed Nov. 14, 1966, Ser. No. 593,667
Claims priority, application Great Britain, Mar. 15, 1966,
11,197/66
U.S. Cl. 106—14.5   5 Claims
Int. Cl. C08h 1/00

ABSTRACT OF THE DISCLOSURE

A gelatine composition used in the formation of rollers and blankets employed in the printing and the tin plate coating industries having incorporated therewith an additive selected from the group consisting of N-phenyl morpholine and 8-hydroxy quinoline to control the surface tackiness thereof.

---

This invention relates to improvements in gelatine compositions such as are used in the formation of blankets and rollers employed in the printing and the tin plate coating industries.

It is well known, that compositions based on powdered or sheet gelatine, dissolved and/or dispersed in water and a polyhydric alcohol such as glycerol, and triethylene glycol, may be produced with a Shore "A" hardness ranging from 10° to 100°, and that such compositions may be modified by the addition of sugars, e.g. sucrose, mannitol, sorbitol and the like, and sulphonated fats, and pigments such as titanium dioxide or lithopone.

Such compositions have been used for many years for the production of printing blankets and printing rollers but have the disadvantage of low meltability and a high degree of tackiness.

It is well known that the meltability can be controlled by the addition of formaldehyde, hexamine, soluble salts of chromium and other substances, but such additions do not reduce surface tackiness. The problem of surface tackiness has, however, now become of considerable importance, particularly in connection with the high speed lacquering and printing of tin coated steel sheet for use in the production of containers such as used in the canning industries, and the object of the present invention is to control the aforesaid surface tackiness.

This object is achieved according to the present invention by the addition either of the heterocyclic organic compounds N-phenyl morpholine or 8-hydroxy quinoline or their derivatives to the gelatine composition whereby the surface tackiness can be controlled between zero and maximum surface tack, depending upon the amount of the particular additive employed.

As stated the amount of the compound to be added can vary depending upon the use of the gelatine composition, and the degree of surface tackiness required, but for normal usage, between 0.1% and 5.0% by weight is generally sufficient.

The following examples are given as illustrative of the invention but the invention is not limited thereto.

Example I

A gelatine composition comprising the following is produced in the usual manner:

| | Parts by weight |
|---|---|
| Gelatine | 13 |
| Water | 16 |
| Triethylene glycol | 40 |
| Sucrose | 8 |
| Lithopone | 3 | and after re-melting there is added 2 parts by weight of N-phenyl morpholine.

Example II

A gelatine composition consisting of

| | Parts by weight |
|---|---|
| Gelatine | 13 |
| Water | 16 |
| Triethylene glycol | 40 |
| Sucrose | 8 |
| Lithopone | 3 | is produced in the usual way and after re-melting there is added 2 parts by weight of 8-hydroxy quinoline.

In both Examples I and II the gelatine composition is produced initially without the addition of the heterocyclic compound, and cast into suitable slabs for subsequent re-melting and production of printing blankets, rollers and the like and the heterocyclic compound is only added when the composition is re-melted immediately before production of the printing blanket or roller for the reason that it has been found that its addition not only controls or destroys surface tackiness it also causes non-meltability when the composition is stored at room temperature for more than seven to ten days.

At room temperature, the surface tackiness, after addition of the heterocyclic compound may only reach a minimum after storage of up to fourteen days, but if the composition is maintained at a temperature of 90° C. or thereabouts, maximum reaction and minimum tackiness occurs within two to four hours.

Example III

In some cases printer's blankets or similar articles are reinforced by a backing of a woven or knitted fabric e.g. a woven fibre glass fabric, the gelatine composition being applied to the surface of the fabric. With such a construction it may not be possible to maintain the coated fabric at an elevated temperature for long owing to flow and distortion of the gelatine composition coating, and in cases where it is not possible to store at room temperature, a more rapid reaction can be initiated by the addition of up to 5% by weight of Formalin, hexamine, chrome alum or the like, in addition to the heterocyclic compound, but this addition of Formalin, hexamine, chrome alum or the like in no way affects the control of surface tackiness, this tackiness being controlled alone by the amount and type of heterocyclic compound used.

A typical composition produced by this latter method is as follows:

| | Parts by weight |
|---|---|
| Gelatine | 22 |
| Water | 19 |
| Glycerol | 43 |
| Sorbitol | 8 |
| Urea | 0.5 |
| Sulphonated tallow | 5.5 |
| Titanium dioxide | 2 | to which is added after re-melting for application to the fabric:

| | Parts by weight |
|---|---|
| Hexamine | 2 |
| 8-hydroxy quinoline | 2 |

What I claim is:

1. A gelatine composition for use in the formation of rollers and blankets employed in the printing and tin plate coating industries, said composition containing gelatine, water, polyhydric alcohol, and a sugar, said composition characterized by an additive incorporated therein to control the surface tackiness, said additive selected from the group consisting of N-phenyl morpholine and 8-hydroxy quinoline, the amount of the additive being between 0.1% and 5% by weight of the composition.

2. A gelatine composition according to claim 1 further containing a substance selected from the group consisting of Formalin, hexamine, and chrome alum, said substance accelerating the reaction between the additive and the composition without affecting the control of the surface tackiness.

3. A gelatine composition according to claim 2, wherein said substance is Formalin.

4. A gelatine composition according to claim 2, wherein said substance is hexamine.

5. A gelatine composition according to claim 2, wherein said substance is chrome alum.

References Cited

UNITED STATES PATENTS

| 2,368,516 | 1/1945 | Bour | 106—125 |
| 2,426,935 | 9/1947 | Kramsky | 106—14.5 |

FOREIGN PATENTS 620,093  5/1961  Canada.

JULIUS FROME, *Primary Examiner.*

T. MORRIS, *Assistant Examiner.*

U.S. Cl. X.R.

106—126, 136; 117—35.6; 260—117